United States Patent
Osugi et al.

(10) Patent No.: US 11,039,236 B2
(45) Date of Patent: Jun. 15, 2021

(54) EAR PAD AND EARPHONE USING THE SAME

(71) Applicants: NEC Platforms, Ltd., Kawasaki (JP); NEC CORPORATION, Tokyo (JP)

(72) Inventors: Kohei Osugi, Kanagawa (JP); Kouji Oosugi, Tokyo (JP); Takafumi Koshinaka, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/615,574

(22) PCT Filed: May 23, 2017

(86) PCT No.: PCT/JP2017/019282
§ 371 (c)(1),
(2) Date: Nov. 21, 2019

(87) PCT Pub. No.: WO2018/216121
PCT Pub. Date: Nov. 29, 2018

(65) Prior Publication Data
US 2020/0092628 A1  Mar. 19, 2020

(51) Int. Cl.
*H04R 1/02* (2006.01)
*H04R 1/08* (2006.01)
(Continued)

(52) U.S. Cl.
CPC ........... *H04R 1/1016* (2013.01); *G06F 21/32* (2013.01); *H04R 1/023* (2013.01); *H04R 1/08* (2013.01); *H04R 1/1075* (2013.01)

(58) Field of Classification Search
CPC . H04R 1/02; H04R 1/08; H04R 1/023; H04R 1/083; H04R 1/086; H04R 1/10;
(Continued)

(56) References Cited

U.S. PATENT DOCUMENTS

2005/0147269 A1   7/2005   Oliveira et al.
2008/0013772 A1   1/2008   Yang
(Continued)

FOREIGN PATENT DOCUMENTS

JP   2007-518355 A   7/2007
JP   2008-011488 A   1/2008
(Continued)

OTHER PUBLICATIONS

International Search Report for PCT/JP2017/019282 dated Aug. 15, 2017 [PCT/ISA/210].
(Continued)

*Primary Examiner* — Thang V Tran
(74) *Attorney, Agent, or Firm* — Sughrue Mion, PLLC

(57) ABSTRACT

The accuracy of ear authentication is ensured over a range from an audible range to a non-audible range. An earphone includes a sound emitting unit, a sound collecting unit, a housing containing the sound emitting unit and the sound collecting unit, a sound hole formed inside the housing, the sound hole being configured to propagate an emitted sound to a predetermined direction and propagate a sound coming from the predetermined direction to the sound collecting unit, and an ear pad covering at least a part of the sound hole, in which an ear-pad side end face is configured so as not to project beyond a sound-hole side end face at least in the predetermined direction, the ear-pad side end face being an end face of the ear pad, the sound-hole side end face being an end face of the sound hole in the predetermined direction.

4 Claims, 13 Drawing Sheets

(51) Int. Cl.
*H04R 1/10* (2006.01)
*G06F 21/32* (2013.01)

(58) Field of Classification Search
CPC .............. H04R 1/1016; H04R 1/1075; H04R 2201/107; G06F 21/32
See application file for complete search history.

(56) References Cited

U.S. PATENT DOCUMENTS

| | | | | |
|---|---|---|---|---|
| 2009/0080670 | A1* | 3/2009 | Solbeck | H04R 25/453 381/71.6 |
| 2011/0182455 | A1* | 7/2011 | Wickstrom | H04R 1/10 381/353 |
| 2013/0083938 | A1 | 4/2013 | Bakalos et al. | |
| 2014/0233746 | A1* | 8/2014 | Tanaka | H04R 1/1058 381/66 |
| 2014/0233849 | A1* | 8/2014 | Weng | G06T 11/00 382/154 |
| 2015/0023542 | A1* | 1/2015 | Shimizu | H04R 1/1075 381/380 |

FOREIGN PATENT DOCUMENTS

| | | |
|---|---|---|
| JP | 2014-532199 A | 12/2014 |
| JP | 2015-023495 A | 2/2015 |
| JP | 2019145964 A * | 8/2019 |
| TW | 201244505 A * | 11/2012 |
| WO | 2012/144040 A1 | 10/2012 |

OTHER PUBLICATIONS

Written Opinion for PCT/JP2017/019282 dated Aug. 15, 2017 [PCT/ISA/237].

* cited by examiner

EAR PAD AND EARPHONE USING THE SAME

This application is a National Stage of International Application No. PCT/JP2017/019282 filed May 23, 2017.

TECHNICAL FIELD

The present invention relates to an ear pad and an earphone using the same.

BACKGROUND ART

As biometric authentication for identifying individuals, face authentication, fingerprint authentication, vein authentication, etc. are commonly known. Further, as another example of biometric authentication, auricle authentication (hereinafter referred to as ear authentication) has been used in recent years. Ear authentication is one of the biometric authentication techniques for identifying individuals by using differences among irregularities of earholes of individuals. Ear authentication has been increasingly put into practical use as a new biometric authentication technique in which a sound that echoes according to the shape of an earhole of a human being is used.

The shape of an ear is complicated. Further, ears are parts whose shapes are relatively significantly different from each other among individuals of human beings and also among individual of other animals having ears. Further, ears are parts that are less likely to change with aging in comparison to physiques and facial appearances.

Further, ear authentication has the following features as compared to other kinds of biometric authentication such as face authentication. One of the features is that unlike face authentication and the like, it is unnecessary to force a user to perform some action. Another feature is that ear authentication is performed in a non-audible range outside the audible range, so that the authentication can be performed while the user is unaware of the authentication.

A mechanism of the ear authentication is described with reference to FIGS. 12A and 12B. FIGS. 12A and 12B are schematic diagrams for explaining the mechanism of the ear authentication.

For example, as shown in FIG. 12A, assume a case in which a microphone-integrated-type earphone is used, and a transmission signal output from a speaker (not shown) disposed inside the microphone-integrated-type earphone passes through an ear canal of an auricle shown in an upper part of FIG. 12B and is reflected by an eardrum. The transmission signal is reflected by the eardrum and the ear canal, and is input to a microphone (not shown) disposed inside the microphone-integrated-type earphone as a reception signal. In this process, it is observed how the sound output through the ear canal has echoed in the ear.

Further, as shown in a lower part of FIG. 12B, based on the difference in acoustic characteristics, i.e., the difference in the shape of the ear canal, characteristics of a spectrum envelope (having mountain/valley shapes) plotted in a graph in which a horizontal axis indicates frequencies and a vertical axis indicates sound pressures are extracted and analyzed. In this way, it is possible to identify individuals, for example, a subject A with a characteristic feature around 1.5 kHz, a subject B with a characteristic feature around 3.4 kHz, and a subject C with a characteristic feature around 5.8 kHz.

As described above, in the ear authentication, the microphone-integrated-type earphone is used and it is observed how a sound output from the speaker of the microphone-integrated-type earphone has echoed in the ear. That is, an individual is identified based on acoustic characteristics that are dependent on the shape of the earhole including, but not limited to, the ear canal. Further, the ear authentication can be performed at all times, provided that the subject wears the microphone-integrated-type earphone. Further, the ear authentication can be performed while the subject is unaware of the authentication. Further, the ear authentication has an advantage that information about the authentication is not easily eavesdropped. Further, in the ear authentication, even if a sound is eavesdropped during the authentication process, it is possible to prevent eavesdropping by changing the sound emitted from the speaker of the microphone-integrated-type earphone when authentication is performed again.

Patent Literature 1 discloses the following technique. That is, it discloses a technique related to an earphone that is configured so that a holding part of an ear chip attached to an earphone housing is held in an earhole and the entire circumference of the holding part is brought into tight contact with the inner surface of the earhole. Further, since the entire circumference of the holding part of the ear chip is brought into tight contact with the earhole, the space inside the earhole is brought into a sealed or semi-sealed state. In this state, as a vibration part of the ear chip vibrates, the pressure in the space fluctuates. As a result, high-quality bass is reproduced by driving the volume of the sealed or semi-sealed space.

CITATION LIST

Patent Literature

Patent Literature 1: International Patent Publication No. WO2012/144040

SUMMARY OF INVENTION

Technical Problem

In the ear authentication, there has been a demand that a range from about 20 Hz, which is in the audible range, to 24 kHz, which is the non-audible range, be covered as a target frequency. However, in the technique related to the ear authentication, there has been a problem that a personal characteristic feature (an individual difference) is unlikely to appear in the sound pressure in frequencies from about 10 kHz to 24 kHz. As a result, in the technique related to the ear authentication, there has been a problem that the accuracy of the ear authentication deteriorates.

Further, as conceivable situations in which the ear authentication is practically used, there are important infrastructures in society, such as urban security, maintenance of important facilities, and medical institutions. Further, in the ear authentication used by police officers, security police (SP), and medical personnel engaged in such important infrastructures, it is necessary to prevent impersonation. As measures to prevent such impersonation, it is possible to identify an individual while the person to be authenticated is unaware of the authentication by using a frequency range in the non-audible range (from 20 kHz to 24 kHz). Further, there has been a demand for ear authentication by which an individual can be reliably identified over a wide frequency range.

Patent Literature 1 discloses a technique related to an earphone that reproduces high-quality bass by sealing or semi-sealing the earphone and an earhole. However, although Patent Literature 1 mentions that the technique disclosed therein satisfactorily reproduces a sound in a low frequency band, it does not disclose how to obtain and handle characteristics of a sound in a high frequency band at all. Further, the earphone disclosed in paragraph 1 is not equipped with a microphone. Therefore, in the technique disclosed in Patent Literature 1, there is a problem that it is impossible to observe how a sound in the high frequency band sent out from the earphone echoes in the earhole.

An object of the present invention is to provide an ear pad capable of ensuring the accuracy of ear authentication over a range from an audible range to a non-audible range, and an earphone using such an ear pad.

Solution to Problem

An earphone according to the present invention includes: sound emitting means; sound collecting means; a housing containing the sound emitting means and the sound collecting means; a sound hole formed inside the housing, the sound hole being configured to propagate an emitted sound to a predetermined direction and propagate a sound coming from the predetermined direction to the sound collecting means; and an ear pad covering at least a part of the sound hole, in which an ear-pad side end face is configured so as not to project beyond a sound-hole side end face at least in the predetermined direction, the ear-pad side end face being an end face of the ear pad, the sound-hole side end face being an end face of the sound hole in the predetermined direction.

Further, an ear pad according to the present invention is an ear pad configured to cover at least a part of a sound hole formed inside a housing, the sound hole being configured to propagate a sound to the outside, the ear pad including an ear-pad side end face configured so as not to project beyond a sound-hole side end face at least in a propagating direction of the sound, the ear-pad side end face being an end face of the ear pad, the sound-hole side end face being an end face of the sound hole in the propagating direction of the sound.

Advantageous Effects of Invention

In view of the above-described problem, an object of the present invention is to provide an ear pad capable of solving a problem that the accuracy of ear authentication should be ensured over a range from an audible range to a non-audible range, and an earphone using such an ear pad.

DESCRIPTION OF EMBODIMENTS

Figure 10:
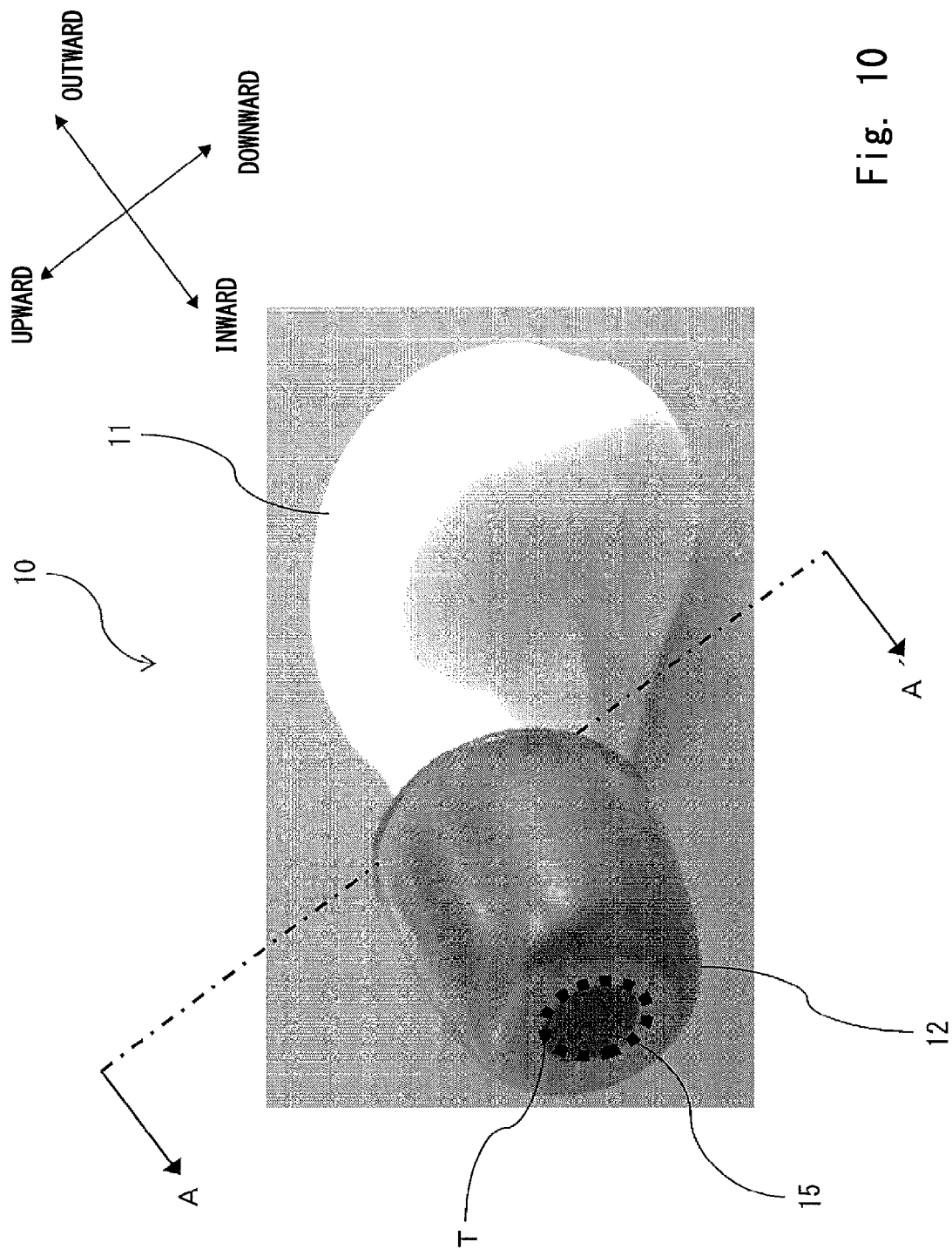
FIG. 10 is an overall perspective view of an example of an earphone using an ear pad using a technique related to ear authentication.
Figure 11:
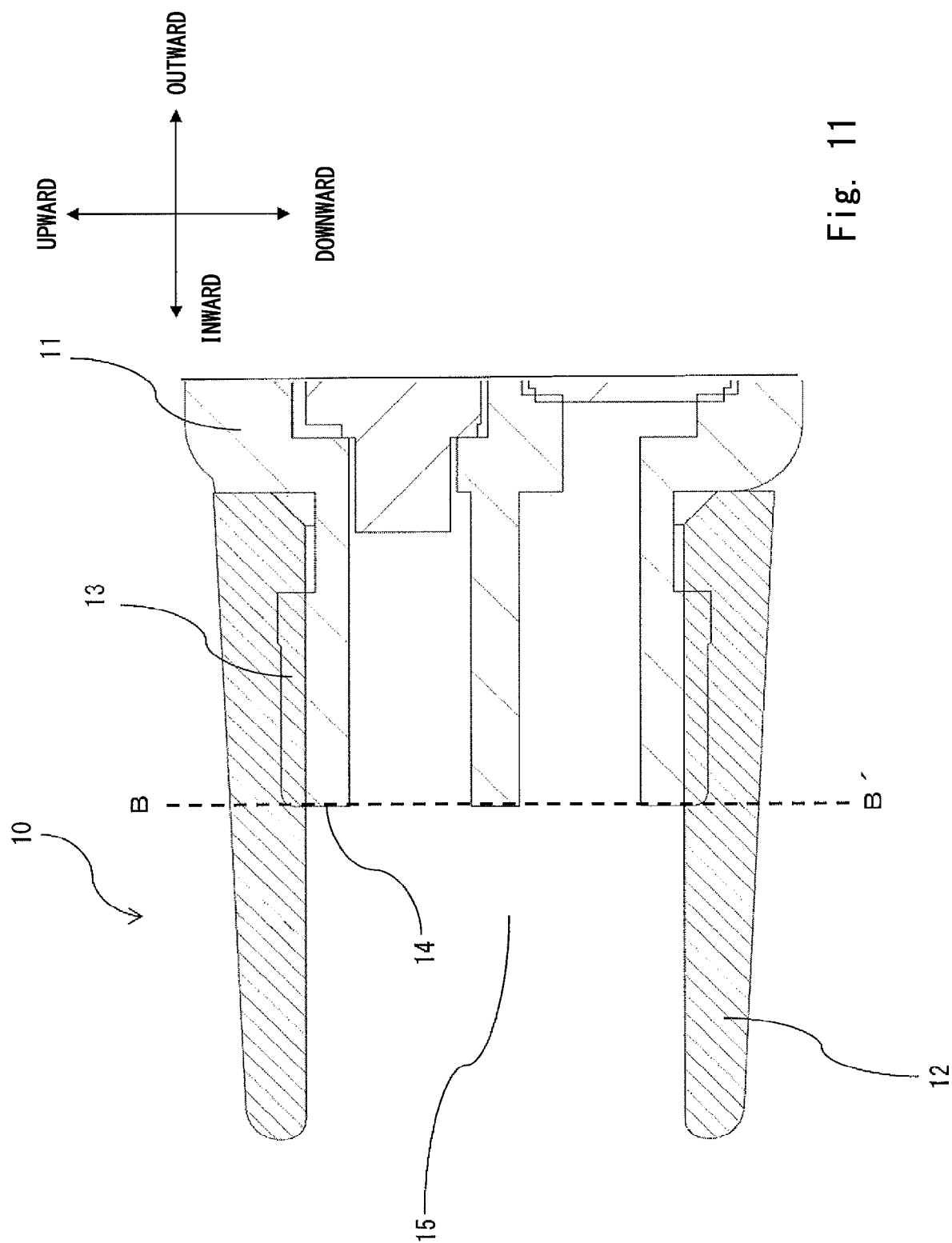
FIG. 11 is a cross section taken along a line A-A' in FIG. 10.
Figure 12A:
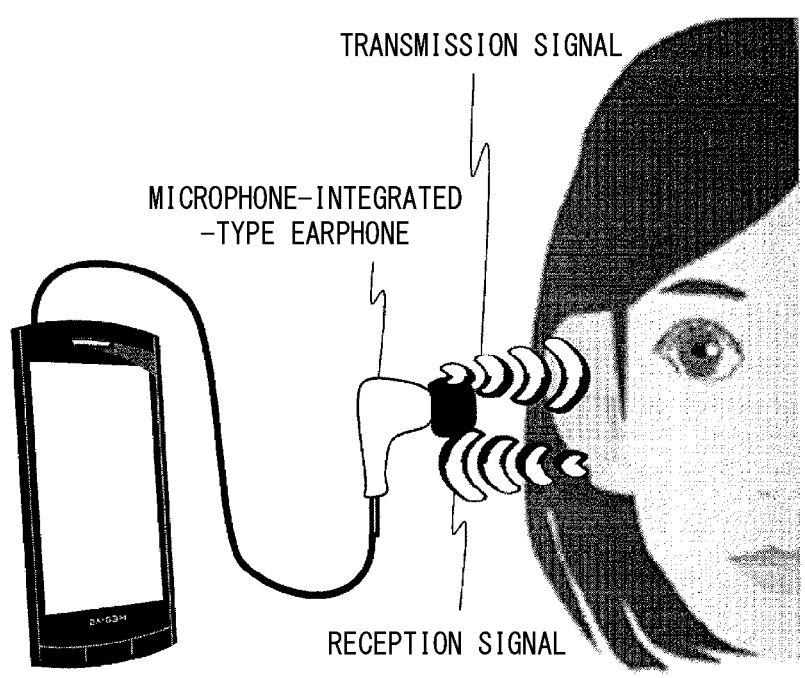
FIG. 12A is a schematic diagram for explaining a mechanism of ear authentication.
Figure 12B:
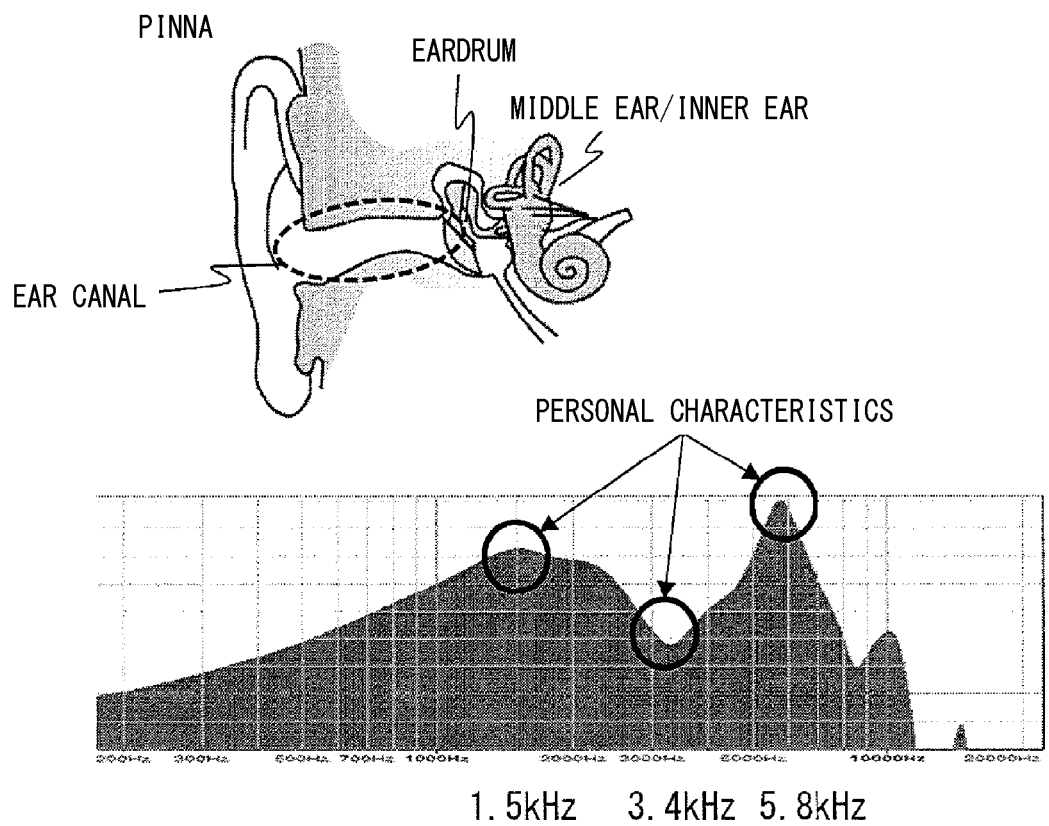
FIG. 12B is a schematic diagram for explaining a mechanism of ear authentication.

Firstly, prior to describing example embodiments according to the present invention, a technique related to ear authentication is described with reference to FIGS. 10 and 11. FIG. 10 is an overall perspective view of an example of an earphone using an ear pad using a technique related to ear authentication. FIG. 11 shows an example of a cross section of the earphone using the ear pad using the technique related to the ear authentication.

Note that in this example embodiment, ear authentication is performed by observing how a sound signal that is generated as a sound signal output from an earphone passes through an ear canal of an auricle and is reflected by an eardrum/ear canal, or as a sound that has passed through an eardrum or the ear canal is reflected by the inside of the eardrum or a bone, and then the reflected sound signal is output after passing though the ear canal again has echoed in the ear. Therefore, an earphone according to this example embodiment described below includes a speaker, which is an example of sound emitting means for outputting a sound signal, and a microphone, which is an example of sound collecting means for receiving a sound signal output after passing through the ear canal. However, since where in the earphone the speaker and the microphone are disposed is not an essential part of the present invention, detailed descriptions thereof are omitted in the below-shown example embodiments.

"Upward", "Downward", "Inward", and "Outward" shown near bidirectional arrows shown in FIGS. 10 and 11 indicate directions when an earphone 10 is attached to an ear (not shown). The upward direction indicates the upward direction of the earphone 10. The downward direction indicates the downward direction of the earphone 10. The inward direction indicates the inward direction of the ear to which the earphone 10 is attached. The outward direction indicates the outward direction in which the earphone 10 is detached from the ear. These directions apply throughout the below-shown example embodiments. Further, there is an earphone 10 for a right ear and one for a left ear. The following description is given without particularly distinguishing between the earphone for the right ear and the one for the left ear. Further, in general, a cord for connecting the earphone 10 to a device that serves as a sound source is connected to the earphone 10. However, the illustration of the cord is omitted in FIGS. 10 and 11. The illustration of the cord is also omitted throughout the below-shown example embodiments.

As shown in FIGS. 10 and 11, the earphone 10, which uses an ear pad using a technique related to ear authentication, includes an earphone main body (a housing) 11 and an ear pad 12. The ear pad 12 is made of a porous material such as urethane. The ear pad 12 is attached to the earphone main body 11 so as to surround a sound hole 15. The sound hole 15 is a hole that propagates a sound emitted from a speaker (not shown) toward an earhole in the inward direction of the earhole. Further, the sound hole 15 also serves as a hole that propagates a sound that is originally emitted from the speaker and then reflected inside the earhole in the outward direction of the earhole in order for a microphone (not shown) to collect the reflected sound. That is, the sound hole 15 is formed in the propagating direction of the sound (i.e., in the inward/outward direction). Further, the sound hole 15 is formed inside the earphone main body 11. Further, the ear pad 12 outputs the sound output from the sound hole 15 of the earphone main body 11 to the ear. Therefore, in the ear pad 12, holes are formed in an area surrounding the circumference T of the sound hole 15. Further, the inner surface of the ear pad 12 is fixed to the earphone main body 11 with a contact part 13 of the earphone main body 11 interposed therebetween. The earphone 10 to which the ear pad 12 is attached is attached in the inward direction toward an earhole (not shown). A dotted line B-B' in FIG. 11 indicates a front end 14 of the sound hole 15 of the earphone main body 11.

Results of ear authentication evaluations performed by using the earphone 10 using the ear pad 12 using the technique related to the ear authentication are described. The number of subjects was four and the number of measurement times for each subject, which were carried out without attaching/detaching the earphone 10, was 30. That is, the measurements were carried out 120 times in total. As the measurement environment, an acoustic testing room was used instead of using an anechoic room. The volume of the speaker that outputs a sound from the earphone 10 was 65 dBspl (equivalent to 65 dBA) at a frequency of 1 kHz. An amplifier of the microphone which picks up a sound output through the earhole of the subject was set to be 20 dB. Further, frequency characteristics of the four subjects were measured by using an FFT (Fast Fourier Transform) measuring device.

As a result of ear authentication evaluations using the earphone 10 using the ear pad 12, there was no significant difference in the sound pressure level among the four subjects at frequencies of about 10 kHz and higher. That is, they exhibited similar waveforms. Therefore, in the case of the earphone 10 using the ear pad 12 using the technique related to the ear authentication, no personal characteristic feature appears in the frequency characteristics. As a result, there is a problem that the authentication accuracy of the ear authentication deteriorates in the technique related to the ear authentication.

A conceivable reason why no individual difference appears in the frequency characteristics is that the material of the ear pad 12 is a porous material such as urethane as described above. The porous material is composed of skeleton parts and gaps (bubbles) between them. As a sound enters the porous material, part of energy of the sound is affected by friction, viscous drag, vibrations of skeletons, and the like in the voids (bubbles) and converted into thermal energy. Therefore, it has been known that when a sound enters a porous material, part of energy of the sound is absorbed. In short, viscous friction of air occurs in bubbles in the ear pad 12. As a result, the peak of the sound pressure is cut off. Therefore, it is considered that no individual difference appears in the frequency characteristics because of the structure in which the ear pad 12 of the earphone 10 protrudes beyond the front end 14 of the sound hole 15 of the earphone main body 11 in the inward direction. Further, it has also been known that even in the case where the ear pad 12 is made of a silicon material, if the ear pad 12 is located in front of (inward of) the front end 14 of the sound hole 15 of the earphone main body 11, the frequency characteristics are affected due to the structure of the ear pad 12.

As described above, it is difficult to achieve the authentication accuracy of ear authentication in an earphone using an ear pad using the technique related to the ear authentication. Example embodiments of ear pads according to the present invention and earphones using such ear pads capable of solving the above-described problem in the related art will be described below.

Example embodiments according to the present invention will be described hereinafter with reference to the drawings.

First Example Embodiment

Figure 1:
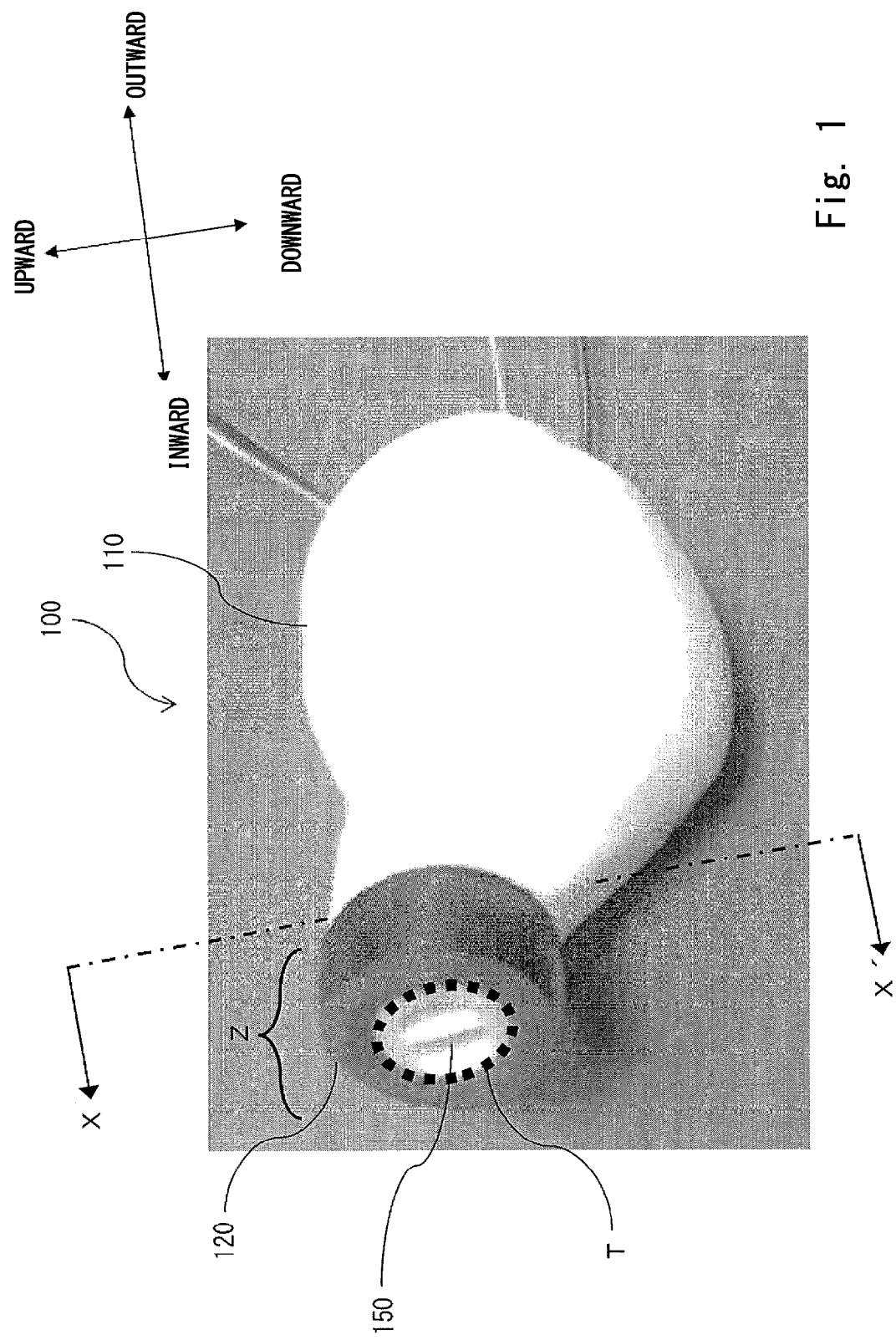
FIG. 1 is an overall perspective view showing an example of an earphone using an ear pad according to a first example embodiment of the present invention.
Figure 2:
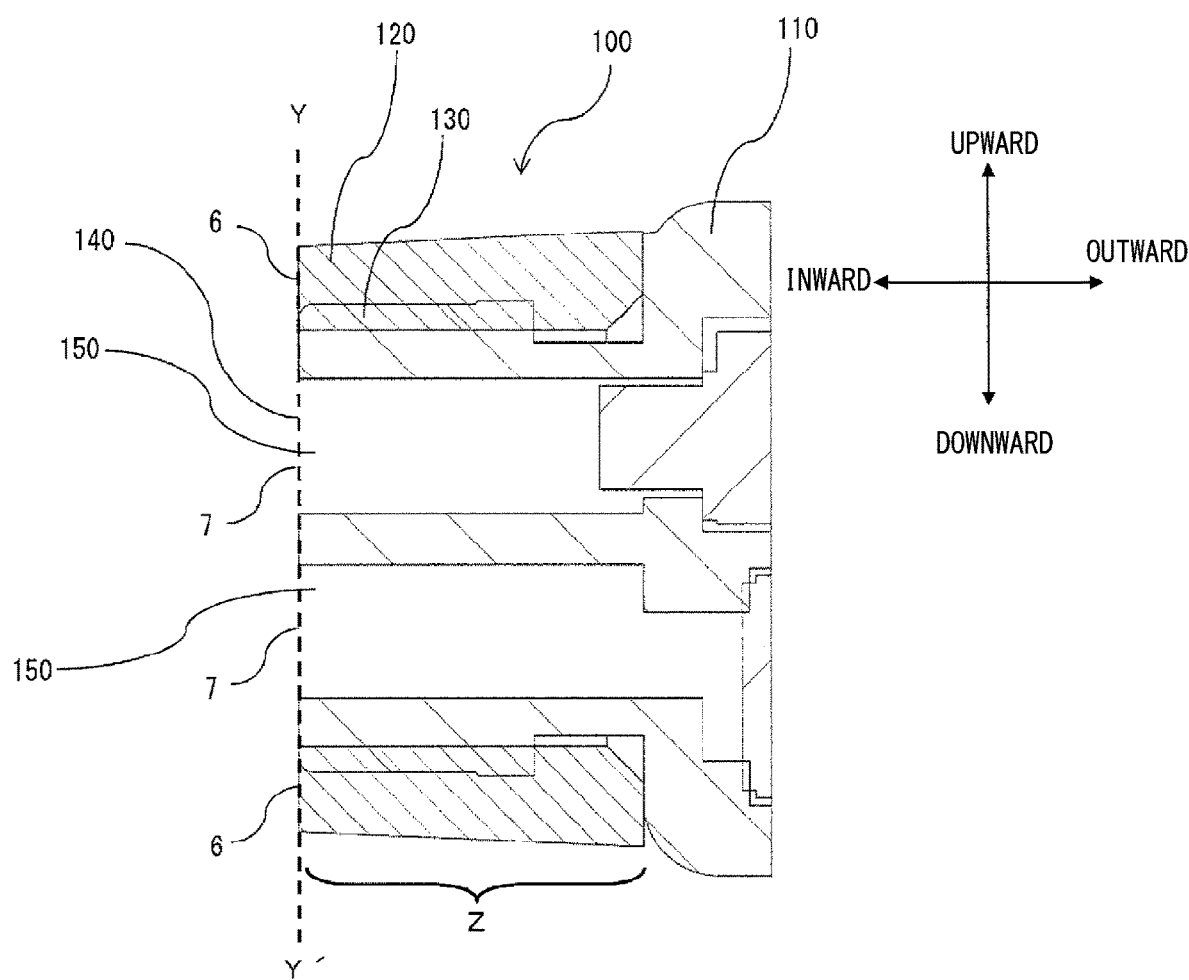
FIG. 2 is a cross section taken along a line X-X' in FIG. 1.

Firstly, a schematic configuration of an earphone using an ear pad according to a first example embodiment of the present invention is described. FIG. 1 shows an example of an earphone using an ear pad according to the first example embodiment of the present invention. FIG. 2 is a cross section taken along a line X-X' in FIG. 1.

As shown in FIG. 1, an earphone 100 according to this example embodiment includes an earphone main body (a housing) 110, and an ear pad 120 in which a part protruding in the inward direction (in an earhole direction) is cut off (hereinafter referred to as a shortened ear pad). The shortened ear pad 120 is made of a porous material such as urethane.

The shortened ear pad 120 is attached to the earphone main body 110 so as to surround a sound hole 150. The sound hole 150 is a hole that propagates a sound emitted from a speaker (not shown) toward an earhole in the inward direction of the earhole. Further, the sound hole 150 also serves as a hole that propagates a sound that is originally emitted from the speaker and then reflected inside the earhole in the outward direction of the earhole in order to collect the reflected sound by a microphone (not shown). That is, the sound hole 150 is formed in the propagating direction of the sound (i.e., in the inward/outward direction). Further, the sound hole 150 is formed inside the earphone main body 110. Note that the shape of the sound hole 150 may be a cylindrical shape or a rectangular column shape. Further, the shortened ear pad 120 outputs the sound output from the sound hole 150 of the earphone main body 110 to the ear. Therefore, in the shortened ear pad 120, holes are formed in an area surrounding the circumference T of the sound hole 150. Further, the shortened ear pad 120 covers the sound hole 150, which is formed inside the part of the earphone main body 11 that corresponds to an area Z where the earphone main body 110 comes into contact with the mouth of the earhole. Further, the inner surface of the shortened ear pad 120 is fixed to the earphone main body 110 with a contact part 130 of the earphone main body 110 interposed therebetween. The earphone 100, to which the shortened ear pad 120 is attached, is in the inward direction toward an earhole (not shown).

It should be noted that as shown in FIG. 2, the end of the shortened ear pad 120 in the inward direction and the front end 140 of the sound hole 150 of the earphone main body 110 are flush with each other with no difference in level therebetween at a dotted line Y-Y'. FIG. 2 shows a state in which an ear-pad side end face 6, which is the end face of the shortened ear pad 120 in the inward direction of the earhole, and a sound-hole side end face 7, which is the end face of the sound hole 150 in the inward direction of the earhole, are flush with each other with no difference in level therebetween at the dotted line Y-Y'. However, the only requirement is that the ear-pad side end face 6, which is the end face of the shortened ear pad 120 in the inward direction of the earhole, should not project beyond the sound-hole side end face 7, which is the end face of the sound hole 150 in the inward direction of the earhole, at least in the inward direction of the earhole.

That is, the ear pad 12 of the earphone 10 using the above-described technique related to the ear authentication has the structure in which the ear pad 12 projects beyond the front end 14 of the sound hole 15 of the earphone main body 11 in the inward direction. Therefore, in the technique related to the ear authentication, the porous material of the ear pad 12 absorbs sound energy and thereby cuts off the peak of the sound pressure. In this example embodiment, the part of the ear pad 120 that projects beyond the front end 140 of the sound hole 150 of the earphone main body 110 in the inward direction is cut off, so that the ear pad 120 is shortened. As a result, the sound energy output from the sound hole 150 and the echo, which is dependent on the shape of the earhole including, but not limited to, the eardrum/ear canal, are prevented from being absorbed by the shortened ear pad 120. This feature will be described later.

Figure 3:
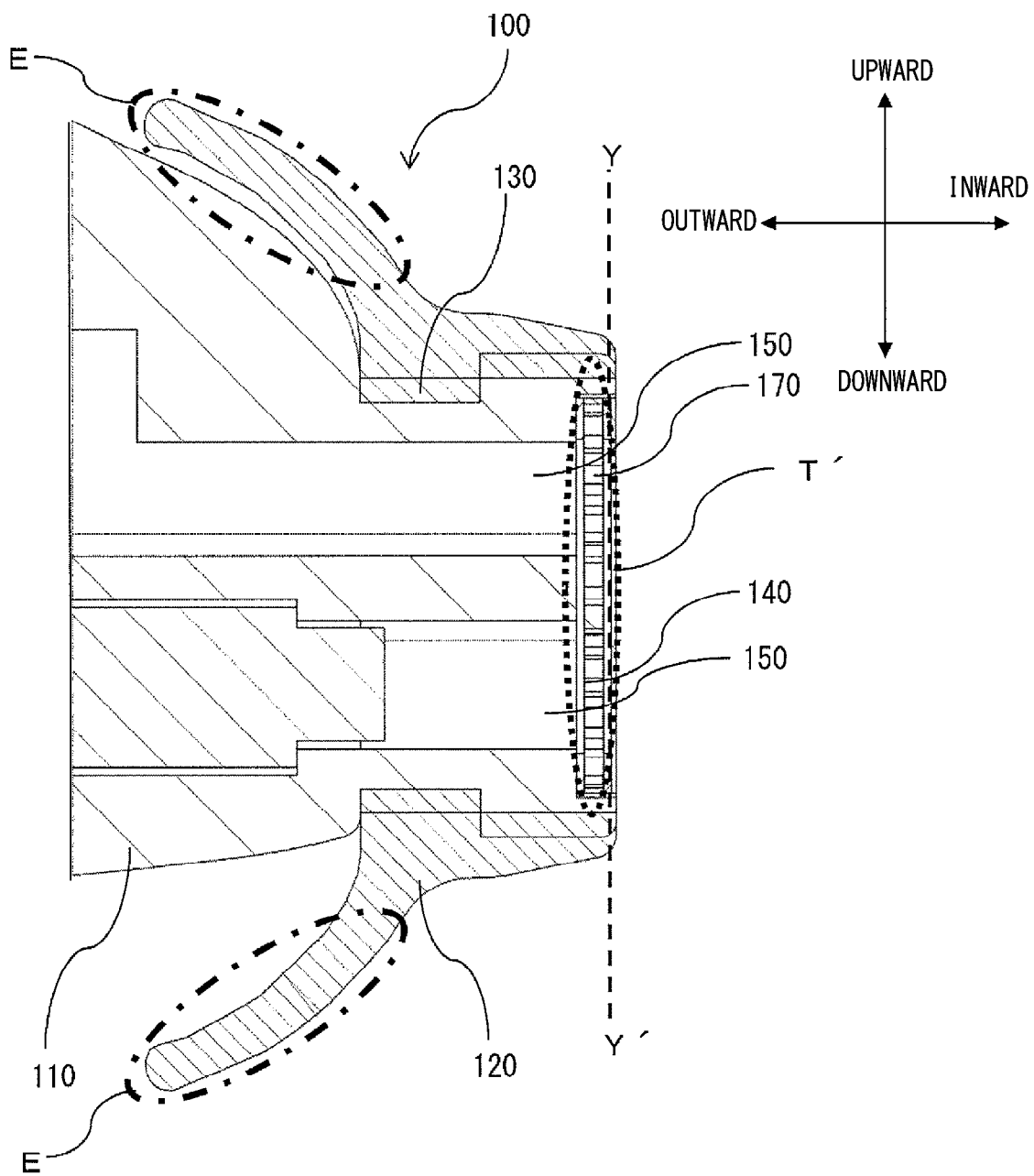
FIG. 3 shows an example in which an earphone using an ear pad according to the first example embodiment is processed into a shape by which the earphone can be easily attached to an ear.
Figure 4:
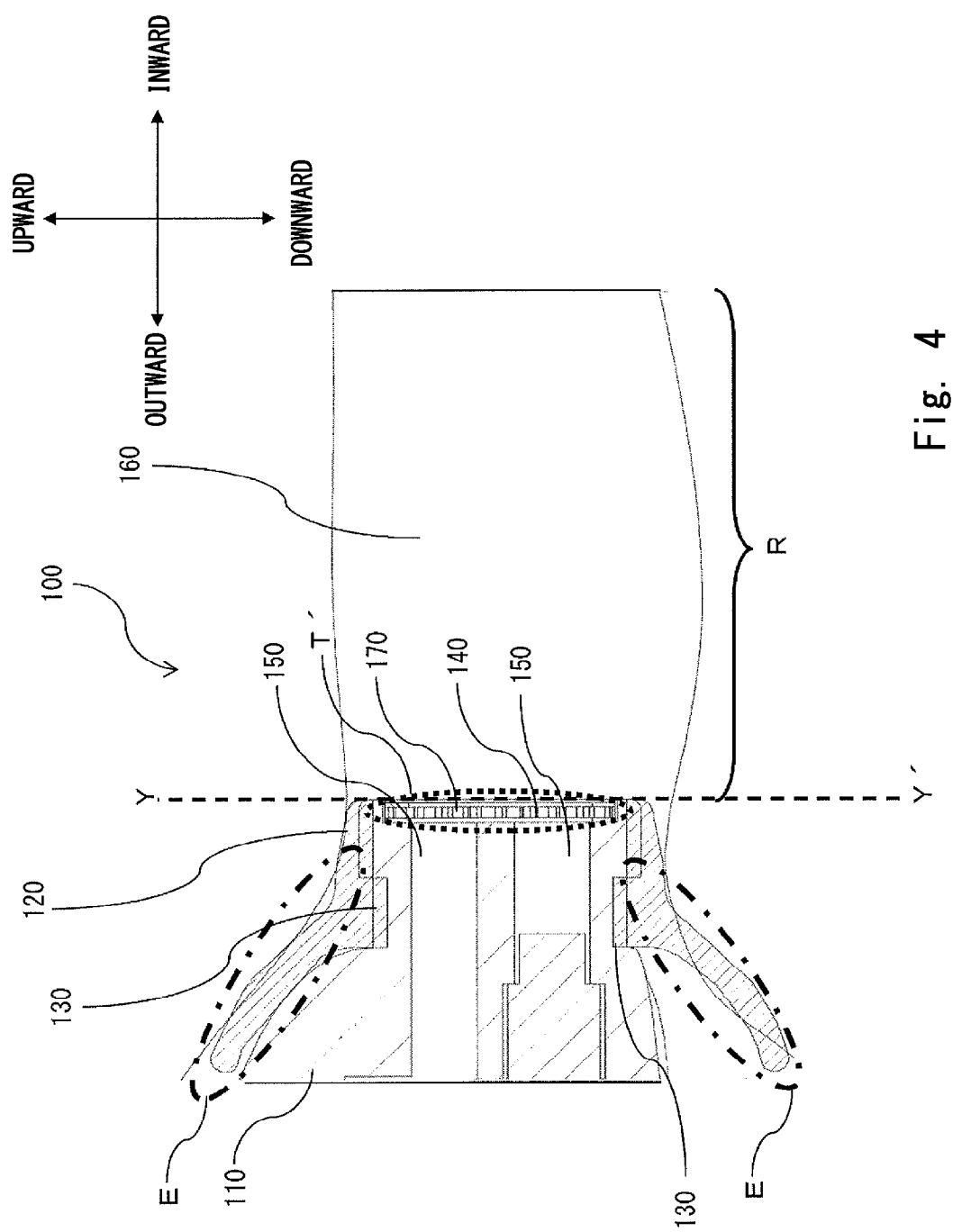
FIG. 4 shows an example of a cross section of the earphone using the ear pad shown in FIG. 3 when the earphone is attached to an ear.

Next, a case where an earphone using an ear pad according to this example embodiment is processed into a shape by which the earphone can be easily attached to an ear is described with reference to FIGS. 3 and 4. FIG. 3 shows an example in which an earphone using an ear pad according to the first example embodiment is processed into a shape by which the earphone can be easily attached to an ear. Further, FIG. 4 shows an example of a cross section of the earphone using the ear pad shown in FIG. 3 when the earphone is attached to an ear. Note that in FIGS. 3 and 4, the inward and outward directions are reversed from those in FIGS. 1 and 2.

In FIG. 3, an earphone 100, which has been processed into a shape by which the earphone can be easily attached to an ear, includes an earphone main body 110 and a shortened earphone pad 120 in which a part protruding in the inward direction is cut off. The earphone 100, to which the ear pad 120 is attached, is attached to an ear in the inward direction toward an ear canal 160 shown in FIG. 4. As described above, there is no difference in level between the shortened ear pad 120 and the front end 140 of the sound hole 150 of the earphone main body 110 at the dotted line Y-Y' shown in FIGS. 3 and 4. Further, as described above with reference to FIG. 2, FIG. 3 also shows a state in which the end face of the shortened ear pad 120 in the inward direction of the earhole and the end face of the sound hole 150 in the inward direction of the earhole are flush with each other with no difference in level therebetween at the dotted line Y-Y'. However, the only requirement is that the end face of the shortened ear pad 120 in the inward direction of the earhole should not project beyond the end face of the sound hole 150 in the inward direction of the earhole at least in the inward direction of the earhole. The shortened ear pad 120 is attached to the earphone main body 110 so as to surround the circumference T' of the sound hole 150, which is a hole through which a sound emitted from the earphone main body 110 is output. Further, the inner surface of the shortened ear pad 120 is fixed to the earphone main body 11 with the contact part 130 of the earphone main body 11 interposed therebetween. Note that in FIGS. 3 and 4, a member 170 that is attached to the part (the dotted line Y-Y') where the end face of the shortened ear pad 120 in the inward direction of the earhole is configured so as not to project beyond the end face of the sound hole 150 in the inward direction of the earhole will be described later.

Further, as shown in FIGS. 3 and 4, a part of the shortened ear pad 120 that comes into contact with the ear is formed into a shape indicated by chain lines E. This shape is adopted in order to prevent a gap from being formed between the earhole (the ear canal) and the ear. That is, the shortened ear pad 120 has the shape indicated by the chain lines E in FIGS. 3 and 4 in order to ensure the hermeticity between the earphone main body 110 and the ear. Note that the shape indicated by the chain lines E is merely an example. That is, the shortened ear pad 120 may have any shape as long as the hermeticity between the earphone main body 110 and the ear can be ensured. By forming the end of the shortened ear pad 120 in the outward direction into the shape indicated by the chain lines E, it is possible to achieve an effect that feature values of a sound in a high frequency range, which are difficult to obtain in the technique related to the ear authentication, can be easily obtained.

Further, the earphone 100 using the ear pad according to this example embodiment has the following features. Since the end face of the shortened ear pad 120 in the inward direction of the earhole is configured so as not to project beyond the end face of the sound hole 150 in the inward direction of the earhole at least in the inward direction of the earhole, the area in which the ear canal 160 is covered by the shortened ear pad 120 is reduced as indicated by a length R in FIG. 4. In other words, the use of the shortened ear pad 120 increases an exposure length (the length R) of the ear canal 160. As the exposure length (the length R) of the ear canal 160 is increased, it is possible to obtain a large number of feature values of a sound that passes through the ear canal. As a result, it becomes easy to obtain a difference in a sound that passes through an ear canal of each individual. Consequently, it is possible to achieve an effect that the accuracy of ear authentication can be improved.

Further, since the end face of the shortened ear pad 120 in the inward direction of the earhole does not project beyond the end face of the sound hole 150 in the inward direction of the earhole at least in the inward direction of the earhole, there is no need to acquire acoustic characteristics of the ear pad itself. As a result, it is possible to solve the problem in the technique related to the ear authentication, i.e., to prevent the phenomenon that part of sound energy is absorbed by the ear pad. Further, it is possible to reduce attenuation of a sound that occurs due to the length of the ear pad adopted in the technique related to the ear authentication.

Figure 5:
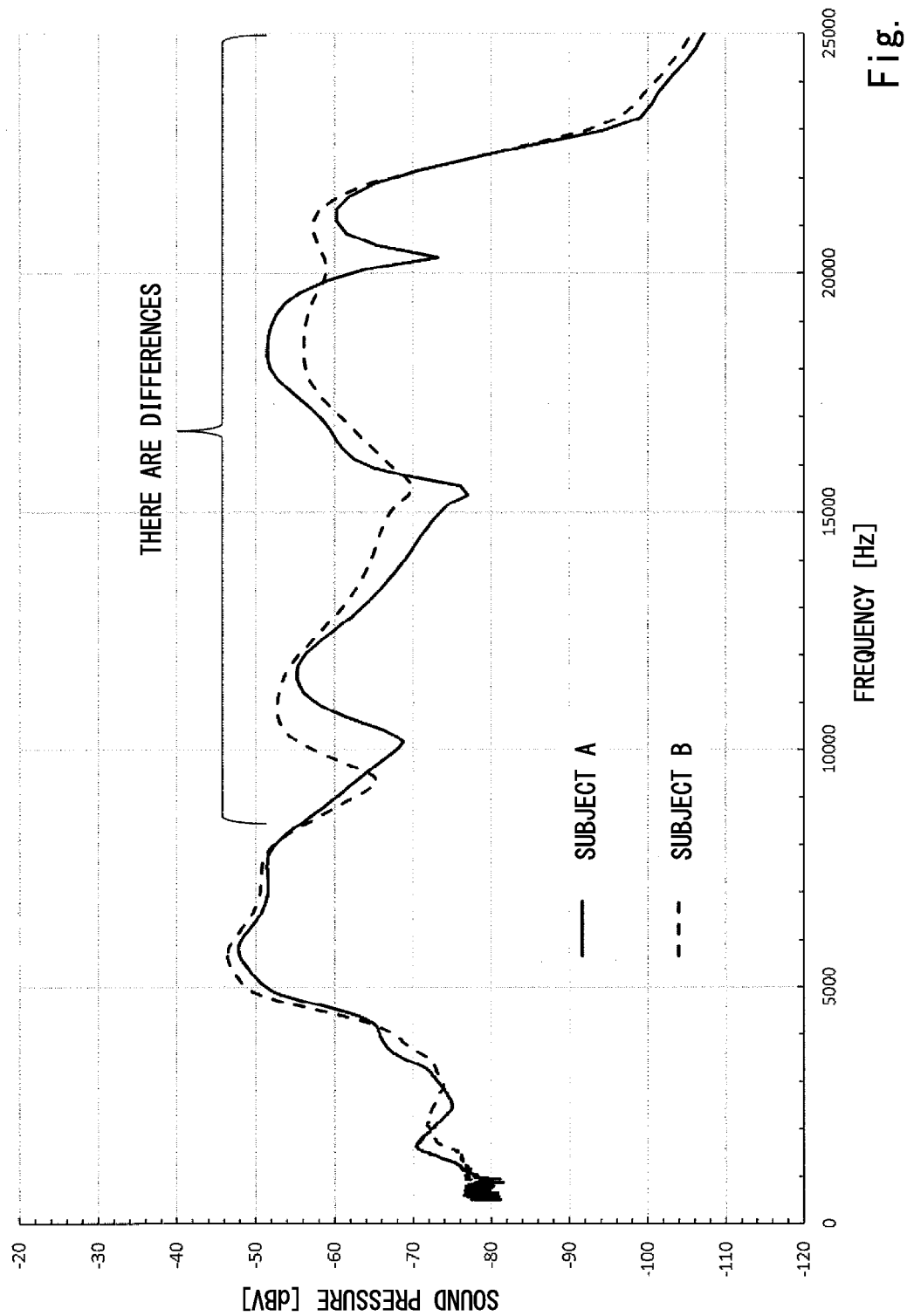
FIG. 5 shows an example of a relation between frequencies and sound pressures when ear authentication evaluations are performed in a state where an earphone using the ear pad shown in FIG. 1 is attached to an ear.

Next, a relation between frequencies and sound pressures when ear authentication is performed in a state where the earphone 100, which is configured so that the end face of the shortened ear pad 120 in the inward direction of the earhole does not project beyond the end face of the sound hole 150 in the inward direction of the earhole at least in the inward direction of the earhole, is attached to an ear is described. FIG. 5 shows an example of a relation between frequencies and sound pressures when ear authentication evaluations are performed in a state where the earphone using the ear pad shown in FIG. 1 is attached to an ear.

The number of subjects was two and the number of measurements times for each subject, which were carried out without attaching/detaching the earphone 100, was 30. That is, the measurements were carried out 60 times in total. As the measurement environment, an acoustic testing room was used instead of using an anechoic room. The volume of the speaker that outputs a sound from the earphone 100 was 65 dBspl (equivalent to 65 dBA) at a frequency of 1 kHz. An amplifier of the microphone which picks up a sound output through the earhole of the subject was set to be 20 dB. Further, frequency characteristics of the two subjects were measured by using an FFT measuring device. FIG. 5 shows results in which average values of 30 measurements for each subject are plotted in a graph in which a horizontal axis indicates frequencies and a vertical axis indicates sound pressures.

As shown in FIG. 5, there is a maximum difference of 12 dBV in the sound pressure between a subject A (indicated by a solid line) and a subject B (indicated by a broken line) in a frequency range from 10 kHz to 25 kHz. It can be understood that the problem in the technique related to the ear authentication, i.e., the problem that no personal characteristic feature appears in the frequency characteristics has been solved by using the earphone 100 using the ear pad according to this example embodiment. As a result, it is possible to improve the authentication accuracy of ear authentication by using the earphone 100 using the shortened ear pad 120 according to this example embodiment.

Second Example Embodiment

Figure 6:
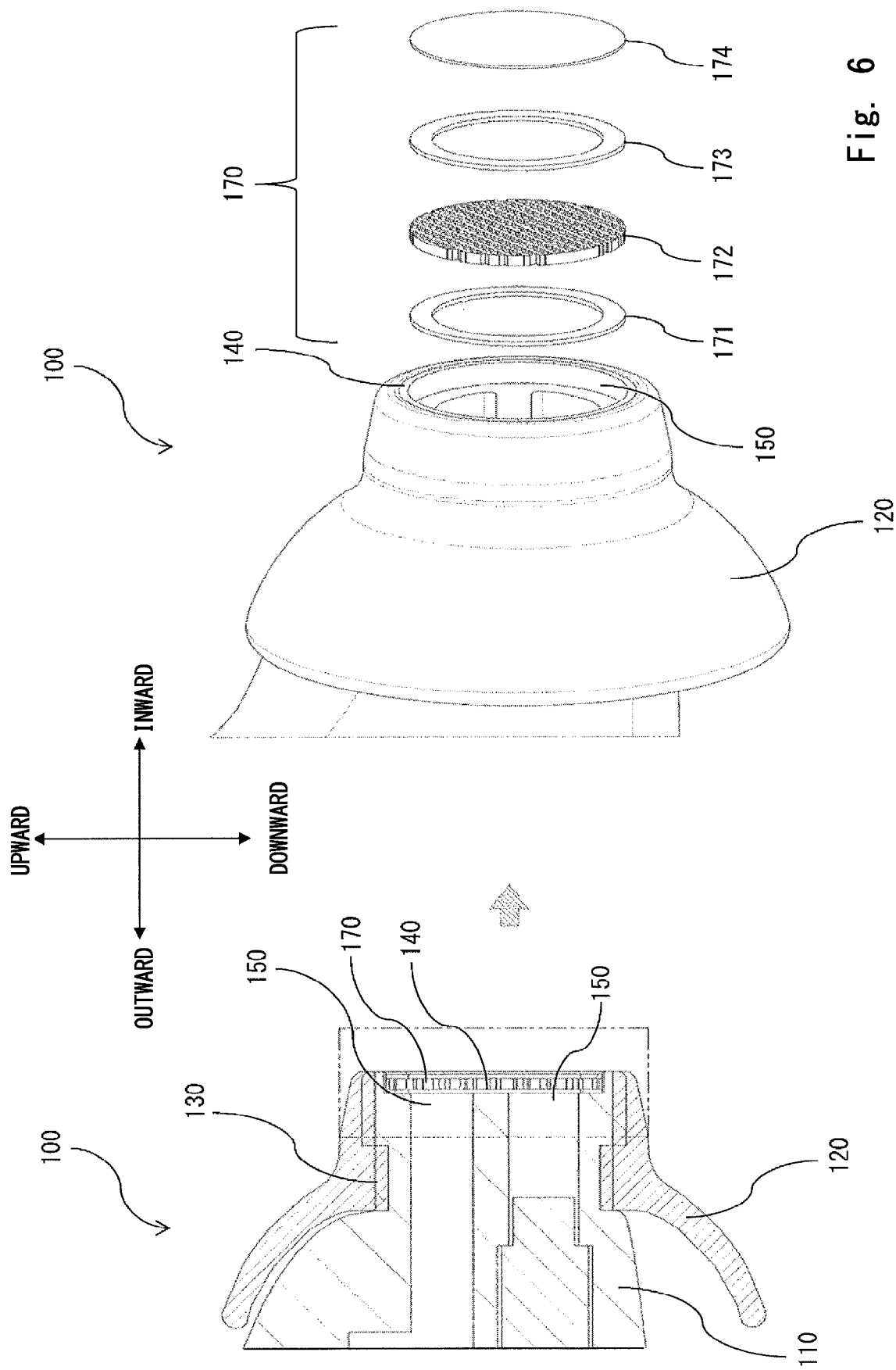
FIG. 6 is a diagram for explaining an example of a structure of a sound-hole front end of an earphone using an ear pad according to a second example embodiment of the present invention.

Next, a schematic configuration of an earphone using an ear pad according to a second example embodiment of the present invention is described. FIG. 6 is a diagram for explaining an example of a structure of a sound-hole front end of an earphone using an ear pad according to the second example embodiment. A right side in FIG. 6 shows an exploded perspective view for explaining a structure of a member 170 shown in a left side of FIG. 6.

As shown in the right side in FIG. 6, in addition to the ear pad 120, a dustproof sheet 174 is attached to the front end 140 of the sound hole 150 of the earphone main body 110 as the member 170. However, if only the dustproof sheet 174 is attached to the front end 140 of the sound hole 150 of the earphone main body 110, the following problem arises. The problem is that the dustproof sheet 174 is easily torn when a pointed member comes into contact with the front end 140 of the sound hole 150 of the earphone main body 110. In order to solve this problem, in this example embodiment, as an example, an SUS (Steel Special Use Stainless) mesh 172 is attached to the front end 140 of the sound hole 150 of the earphone main body 110 with double-sided tape 171 interposed therebetween. Further, the SUS mesh 172 and the dustproof sheet 174 are attached to each other with double-sided tape 173 interposed therebetween. That is, the member 170 is composed of the double-faced tape 171, the SUS mesh 172, the double-faced tape 173, and the dustproof sheet 174, which are arranged in this order from the outer side of the earphone 100 to the inner side thereof. Further, this member 170 is attached to the front end 140 of the sound hole 150 of the earphone main body 110.

Figure 7:
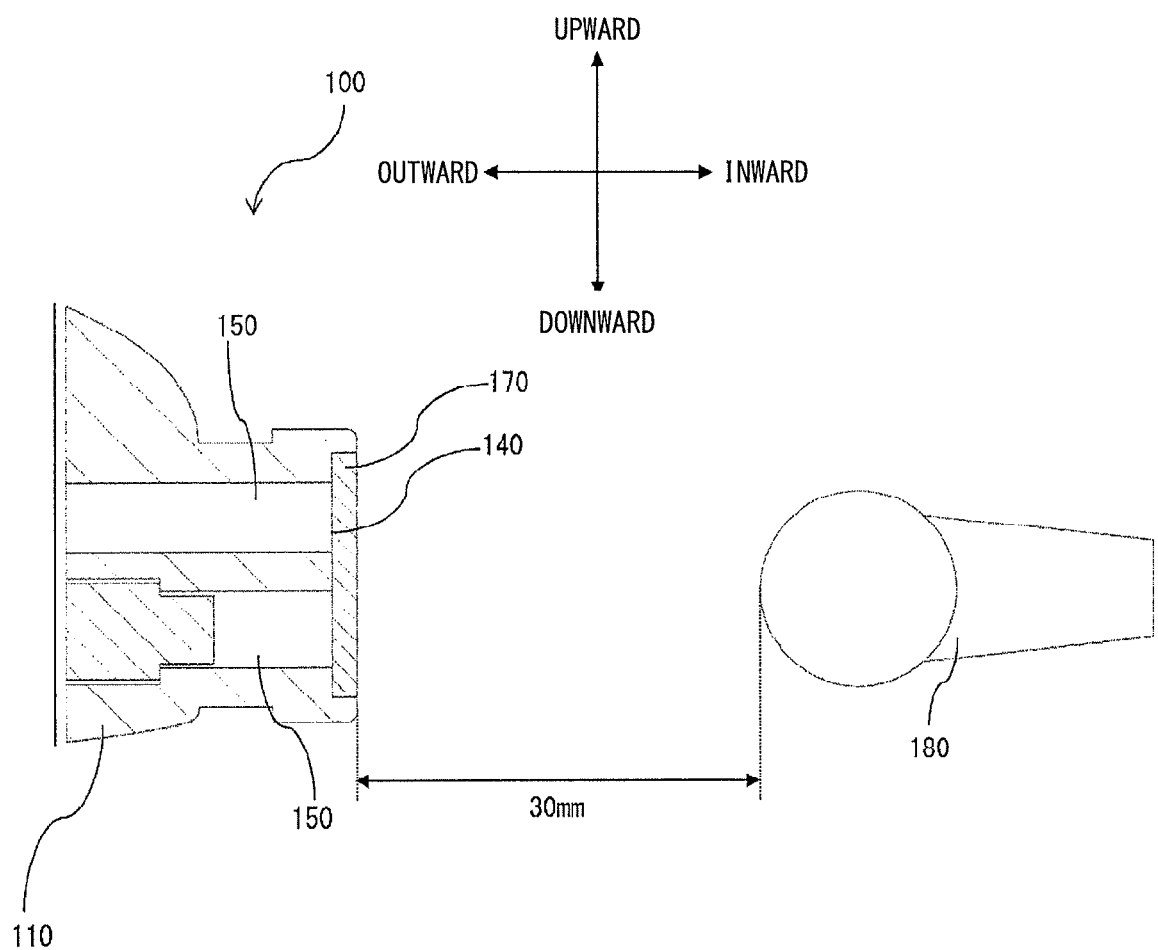
FIG. 7 is a schematic diagram for explaining an environment for measuring frequency characteristics of the earphone using the ear pad according to the second example embodiment.
Figure 8:
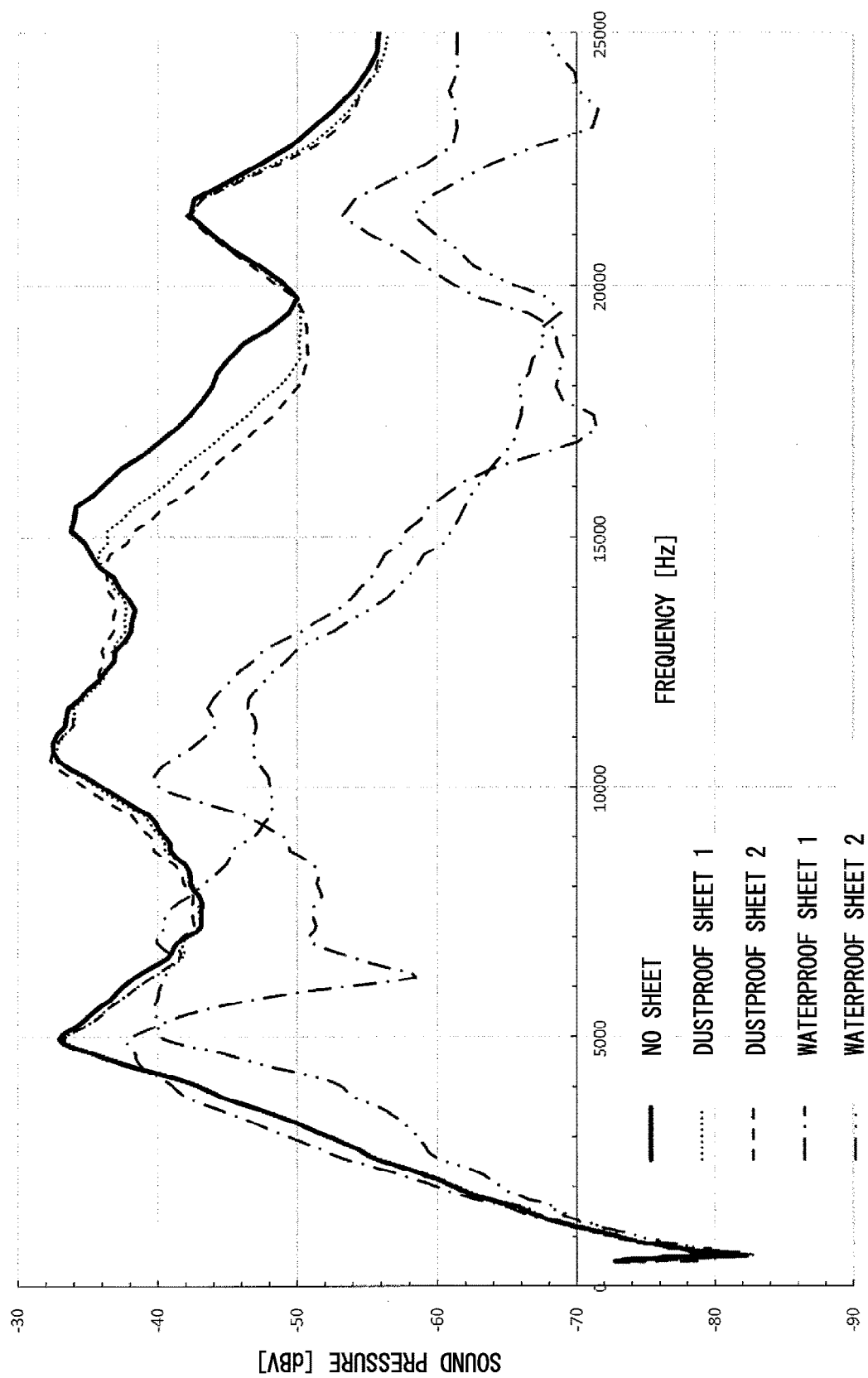
FIG. 8 shows an example of frequency characteristics of the earphone using the ear pad according to the second example embodiment.

It is common practice to apply waterproofing and/or dustproofing to an apparatus attached to a part of a human body. The reason why the dustproof sheet is adopted, rather than a waterproof sheet, as the member 170 in this example embodiment is described hereinafter with reference to FIGS. 7 and 8. FIG. 7 is a schematic diagram for explaining an environment for measuring frequency characteristics of an earphone using an ear pad according to the second example embodiment. FIG. 8 shows an example of frequency characteristics of the earphone using the ear pad according to the second example embodiment.

As shown in FIG. 7, the member 170 was attached to the front end 140 of the sound hole 150 of the earphone main body 110. Further, a test microphone 180 was disposed at a place 30 mm away from the member 170 of the earphone main body 110. In this state, sound pressure levels of a sound signal output from the sound hole 150 of the earphone 100 with respect to frequencies thereof were measured. As the element constituting the member 170, measurements were carried out for five cases, i.e., for a dustproof sheet 1, a dustproof sheet 2, a waterproof sheet 1, a waterproof sheet 2, and no dustproof/waterproof sheet. FIG. 8 shows results of the measurements.

As seen in FIG. 8, there was no difference in the sound pressure level among the no-sheet (a solid line), the dustproof sheet 1 (a dotted line), and the dustproof sheet 2 (a broken line) substantially over the whole frequency bands. In contrast, there was a significant drop (up to about 26 dBV) in the sound pressure level in a high frequency band (about 10 kHz or higher) in each of the waterproof sheet 1 (a chain line) and the waterproof sheet 2 (a double-dashed chain line) as compared to those of the no sheet (the solid line), the dustproof sheet 1 (the dotted line), and dustproof sheet 2 (the broken line).

It is considered that this phenomenon occurred because of the following reason. The reason is that the dustproof sheets are mesh-type sheets. That is, since air allows a sound propagate through the mesh of the mesh-type sheet, the sound pressure level is less likely to be attenuated. In contrast to this, the waterproof sheets are film-type sheets. That is, a sound propagates as the film-type sheet vibrates. Therefore, the sound is temporarily blocked by the sheet. Further, the cycle at which the sheet vibrates becomes shorter as the frequency component of the sound becomes higher. As a result, the higher the frequency band of the sound is, the more its volume is blocked by the sheet and the more its sound pressure level is attenuated. Based on the measurement results shown in FIG. 8, the dustproof sheet 174 was adopted in this example embodiment.

By adopting the shortened ear pad 120 described in the first example embodiment, the sound hole 150 of the earphone main body 110 is more likely to be exposed to the open air than in the technique related to the ear authentication. As a result, dust is more likely to enter the sound hole 150 of the earphone main body 110. In order to solve the problem that dust is likely to enter the sound hole 150, the dustproof sheet 174 and the SUS mesh 172 are attached to the front end 140 of the sound hole 150 as the member 170 in this example embodiment. In this way, a dustproof effect can be obtained. Further, compared to the technique related to the ear authentication, it is possible to achieve an effect that the accuracy of the ear authentication can be ensured over a range from the audible range to the non-audible range without affecting the sound pressure level in the high frequency band.

Third Example Embodiment

Next, an overall configuration of an earphone using an ear pad according to a third example embodiment is described.

Figure 9:
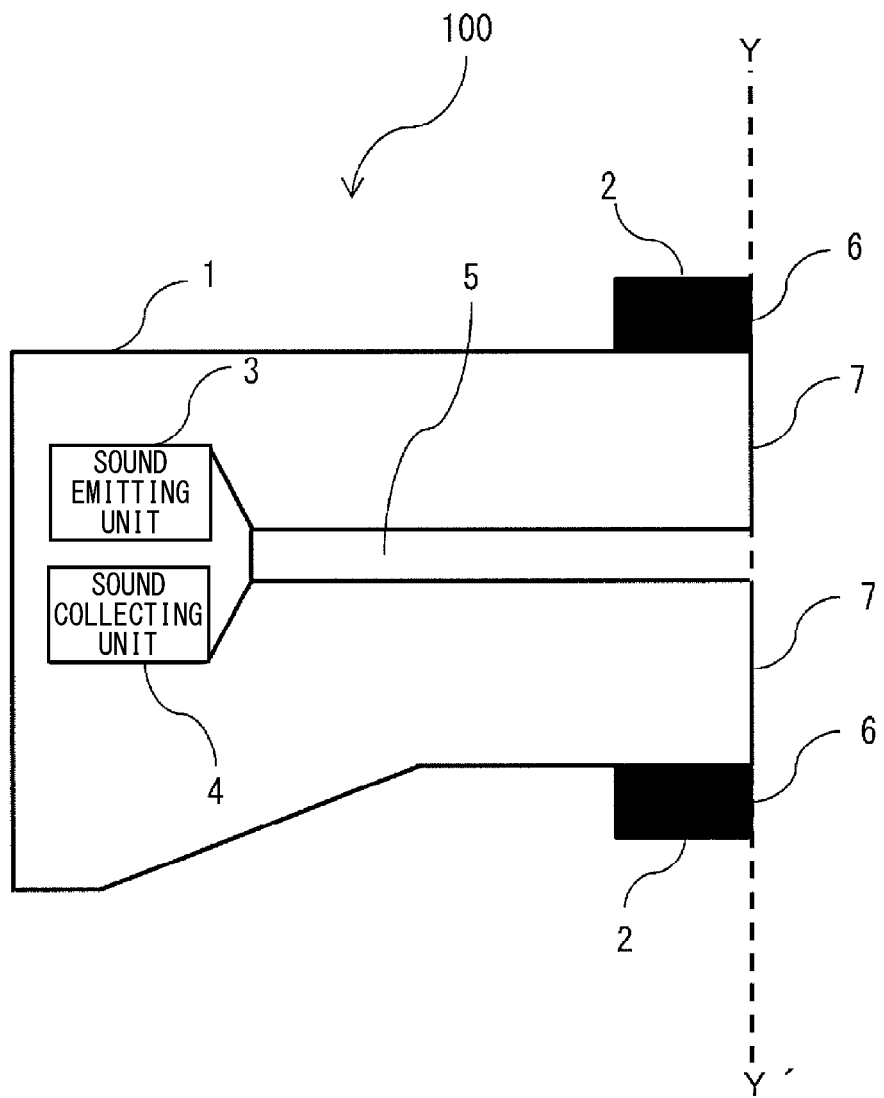
FIG. 9 shows an example of a schematic configuration of an earphone using an ear pad according to a third example embodiment of the present invention.

FIG. 9 shows an example of a schematic configuration of an earphone using an ear pad according to the third example embodiment. The earphone 100 using the ear pad according to this example embodiment includes a sound emitting unit 3, a sound collecting unit 4, a housing 1, a sound hole 5, and an ear pad 2.

The sound emitting unit 3 emits a sound. The sound collecting unit 4 collects the emitted sound. The housing 1 contains the sound emitting unit 3 and the sound collecting unit 4. The sound hole 5 is formed inside the housing 1 and propagates the emitted sound to a predetermined direction. Further, the sound hole 5 propagates a sound coming from the predetermined direction to the sound collecting unit 4. The ear pad 2 covers at least a part of the sound hole 5. Further, an ear-pad side end face 6, which is an end face of the ear pad 2, is configured so as not to project beyond a sound-hole side end face 7, which is an end face of the sound hole 5 in the predetermined direction of the sound hole 5, at least in the predetermined direction (a doted line Y-Y').

In this example embodiment, the ear-pad side end face 6, which is the end face of the ear pad 2, is configured so as not to project beyond the sound-hole side end face 7, which is the end face of the sound hole 5 in the predetermined direction of the sound hole 5, at least in the predetermined direction. In this way, it is possible to ensure the accuracy of the ear authentication over a range from the audible range to the non-audible range.

Note that the above-described example embodiments are described on the assumption that the target of the ear authentication is a human being. However, the target of the ear authentication is not limited to human beings. That is, the present invention can be applied to authentication of an individual such as an animal having an ear canal.

Although the present invention is described above with reference to example embodiments, the present invention is not limited to the above-described example embodiments. Various modifications that can be understood by those skilled in the art can be made to the configuration and details of the present invention within the scope of the present invention.

REFERENCE SIGNS LIST

1 HOUSING
2 EAR PAD
3 SOUND EMITTING UNIT
4 SOUND COLLECTING UNIT
5 SOUND HOLE
6 EAR-PAD SIDE END FACE
7 SOUND-HOSE SIDE END FACE
100 EARPHONE
110 EARPHONE MAIN BODY (HOUSING)
120 SHORTENED EAR PAD
130 CONTACT SURFACE
140 FRONT END
150 SOUND HOLE
160 EAR CANAL
170 MEMBER
171, 173 DOUBLE-SIDED TAPE
172 SUS MESH
174 DUSTPROOF SHEET
180 TEST MICROPHONE

The invention claimed is:

1. An earphone comprising:
   sound emitting unit;
   sound collecting unit;
   a housing containing the sound emitting unit and the sound collecting unit;
   a sound hole formed inside the housing, the sound hole being configured to propagate an emitted sound to a predetermined direction and propagate a sound coming from the predetermined direction to the sound collecting unit; and
   an ear pad covering at least a part of the sound hole, wherein
   an ear-pad side end face is configured so as not to project beyond a sound-hole side end face at least in the predetermined direction, the ear-pad side end face being an end face of the ear pad, the sound-hole side end face being an end face of the sound hole in the predetermined direction,
   a dustproof sheet is provided at the sound-hole side end face, and
   an SUS (Steel Special Use Stainless) mesh is provided between the sound-hole side end face and the dustproof sheet.

2. The earphone according claim 1, wherein the ear pad is formed so as to fill a gap between the housing and an earhole when the earphone is inserted into the earhole.

3. An ear pad configured to cover at least a part of a sound hole formed inside a housing, the sound hole being configured to propagate a sound to the outside, the ear pad comprising:
   an ear-pad side end face configured so as not to project beyond a sound-hole side end face at least in a propagating direction of the sound, the ear-pad side end face being an end face of the ear pad, the sound-hole side end face being an end face of the sound hole in the propagating direction of the sound,
   a dustproof sheet is provided at the sound-hole side end face, and
   an SUS (Steel Special Use Stainless) mesh is provided between the sound-hole side end face and the dustproof sheet.

4. The ear pad according to claim 3, wherein the ear pad is formed so as to fill a gap between the housing and an earhole when the housing is inserted into the earhole.

* * * * *